(12) United States Patent
Finkelstein

(10) Patent No.: US 11,456,924 B2
(45) Date of Patent: Sep. 27, 2022

(54) SYSTEMS, METHODS, AND APPARATUSES FOR INTERNET OF THINGS-BASED DOCSIS

(71) Applicant: COX COMMUNICATIONS, INC., Atlanta, GA (US)

(72) Inventor: Jeffrey L. Finkelstein, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 291 days.

(21) Appl. No.: 16/570,103

(22) Filed: Sep. 13, 2019

(65) Prior Publication Data

US 2021/0083942 A1 Mar. 18, 2021

(51) Int. Cl.
*H04L 41/0896* (2022.01)
*H04L 41/12* (2022.01)
*H04L 67/12* (2022.01)

(52) U.S. Cl.
CPC .......... *H04L 41/0896* (2013.01); *H04L 41/12* (2013.01); *H04L 67/12* (2013.01)

(58) Field of Classification Search
None
See application file for complete search history.

(56) References Cited

U.S. PATENT DOCUMENTS

| 7,151,782 B1* | 12/2006 | Oz | H04L 67/14 370/468 |
| 2019/0150134 A1* | 5/2019 | Kakinada | H04W 72/048 370/330 |
| 2020/0092701 A1* | 3/2020 | Arnberg | H04M 1/72415 |

* cited by examiner

*Primary Examiner* — Shripal K Khajuria
(74) *Attorney, Agent, or Firm* — Eversheds Sutherland (US) LLP

(57) ABSTRACT

The disclosed systems are directed to Internet of Things (IoT) devices and techniques. In particular, the disclosed systems can identify an IoT device and a corresponding device type to be scheduled for a data transmission or a data reception over at least one wired or wireless network; determine a data priority associated with the IoT device, the data priority corresponding to the device type; determine, based at least in part on the data priority or the device type, a bandwidth and a time for data transmission or reception to or from the IoT device using an IoT data over cable service interface specification (IoT DOCSIS) protocol; generate a grant packet in accordance with a service flow, the service flow registered for the second device; and communicate with the second device at the time and at the bandwidth.

20 Claims, 8 Drawing Sheets

SYSTEMS, METHODS, AND APPARATUSES FOR INTERNET OF THINGS-BASED DOCSIS

TECHNICAL FIELD

The present disclosure relates to Internet of Things-based data over cable service interface specification ("DOCSIS").

BACKGROUND

In recent years, Internet of Things (IoT) devices and techniques have gained prominence in various consumer, commercial, industrial, and infrastructural applications. Such IoT devices may communicate using any suitable wireless communications protocol. For example, wireless communication can operate in accordance with various standards such as Institute of Electrical and Electronics Engineers (IEEE) 802.11x, Bluetooth, global system for mobile communications (GSM), code division multiple access (CDMA), third generation partnership project (3GPP), 5th generation wireless systems (5G), IEEE 802.11, and/or the like. In some implementations, wireless networks based on the IEEE 802.11 wireless radio local area network (RLAN) standard, commercially known as WiFi, Wi-Fi, or WIFI, had led to availability of wireless devices and chipsets implementing various aspects of the IEEE 802.11 standards. As mobile data traffic grows and wireless devices become more abundant and diverse, wireless service providers that operate wireless networks and/or IoT devices that use such protocols may face significant management overhead.

BRIEF DESCRIPTION OF THE DRAWINGS

Reference will now be made to the accompanying drawings, which may not necessarily be drawn to scale, and wherein.

DETAILED DESCRIPTION OF VARIOUS EMBODIMENTS

Figure 1:
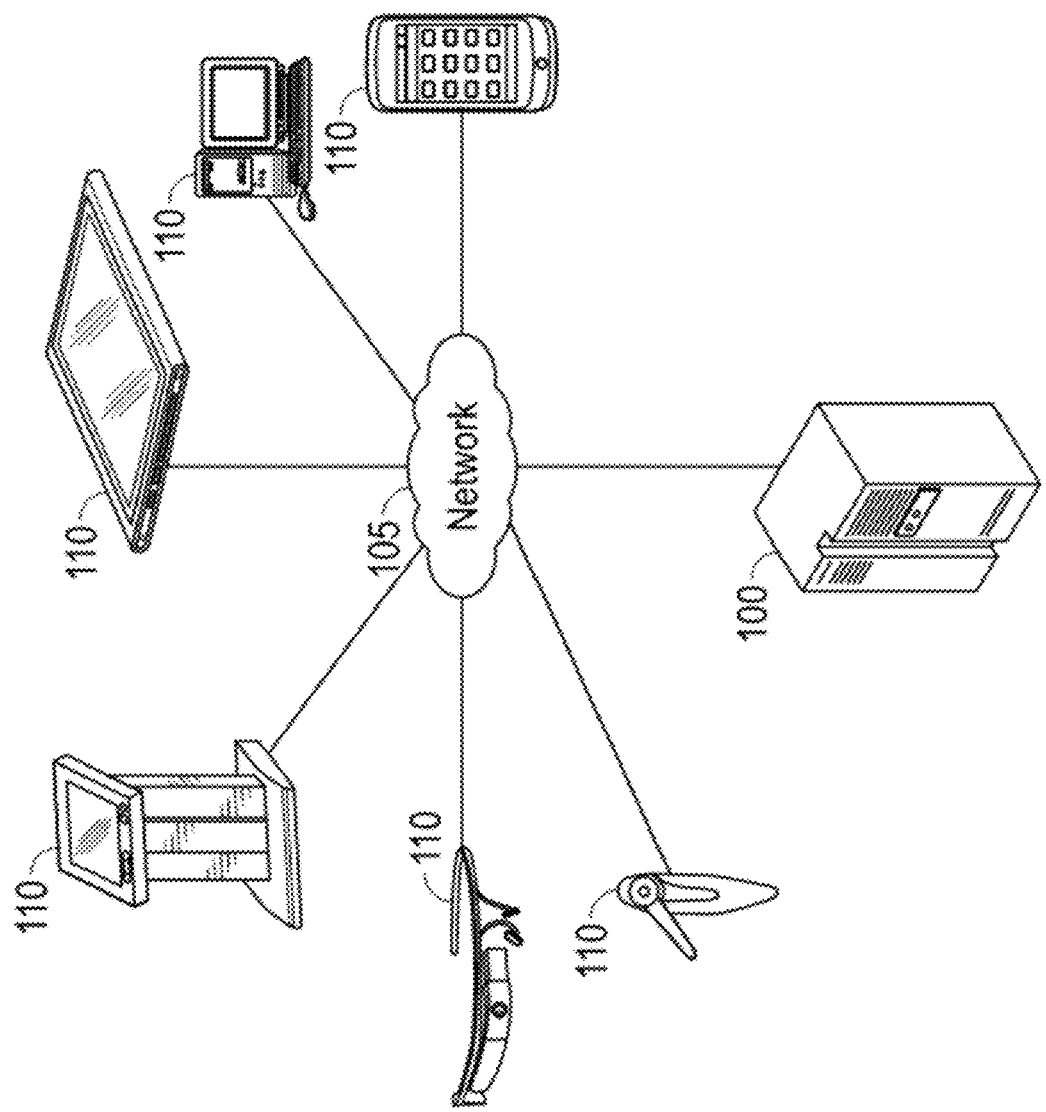
FIG. 1 shows an example schematic diagram of a system that can be used to practice embodiments of the present disclosure.

The details of one or more embodiments of the subject matter described herein are set forth in the accompanying drawings and the description below. Other features, aspects, and advantages of the subject matter will become apparent from the description, the drawings, and the claims.

In various embodiments, described herein include systems, methods, and apparatuses for IoT device communications and related protocols. In some aspects, a method may include: identifying an IoT device and a corresponding device type to be scheduled for a data transmission or a data reception over at least one wired or wireless network; determining a data priority associated with the IoT device, the data priority corresponding to the device type; determining, based at least in part on the data priority or the device type, a bandwidth and a time for data transmission or reception to or from the IoT device using an IoT Data Over cable Service Interface Specification ("DOCSIS") protocol; generating a grant packet in accordance with a service flow, the service flow registered for a second device; and communicating with the second device at the time and at the bandwidth.

In some examples, the IoT DOCSIS protocol comprises a predetermined bandwidth threshold, and the bandwidth is below the predetermined bandwidth threshold. In other examples, the service flow comprises a DOCSIS-based quality of service (QoS). In some examples, the IoT DOCSIS protocol comprises a real time and a non-real time communication mode. In other examples, the device is configured to communicate with the second device at the time and at the bandwidth comprises using the IoT DOCSIS protocol to generate a medium access control (MAC) layer or a physical layer (PHY) based frame. In some examples, the device is configured to identify an IoT device comprising a pluggable PHY layer device. In other examples, the IoT device further uses the IoT DOCSIS protocol to determine additional bandwidths and times for data transmission for one or more additional IoT devices. In some examples, the wired network can include an Ethernet network, and the wireless network can include, but not be limited to, a Wi-Fi, a cellular, a narrowband IoT, a low-power wireless access network (LPWAN), or a 5G network.

Other embodiments of this aspect include corresponding systems, apparatus, and computer programs, configured to perform the actions of the methods, encoded on computer storage devices.

Particular embodiments of the subject matter described herein can be implemented so as to realize one or more of the following advantages. Improve network stability and operational data transfer rates and, in turn, improve the user experience. Reduce the costs associated with routing network traffic, network maintenance, network upgrades, and/or the like.

Further, in some aspects, the disclosed IoT DOCSIS protocol can serve to reduce the power consumption and/or bandwidth of IoT devices on a network, and may serve to increase the speed and/or efficiency of communications between IoT devices. In other aspects, the IoT devices can, by virtue of using the disclosed IoT DOCSIS protocol, have a reduced physical footprint. For example, such IoT devices may not require an Ethernet switch, a timing chip, and/or the like. Rather, the IoT devices may be configured to use a low-bandwidth (e.g., kilobit) interface, to generate framed packets from a corresponding MAC layer. Further, the IoT devices may use a PHY layer that can be plugged in (e.g., pluggable PHY) and which can match the frames for transmission. In some examples, the IoT device transmissions using the disclosed IoT DOCSIS protocol may avoid more complex scheduling tasks such as channel selection, which may be associated with traditional wireless (e.g., cellular, Wi-Fi, etc.) communications protocols.

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid-state drive (SSD)), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

FIG. 1 provides an illustration of an example embodiment of the present disclosure. As shown in FIG. 1, this particular embodiment may include one or more management computing entities 100, one or more networks 105, and one or more user devices 110. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture. Further, the management computing entities 100 can include a hub device (e.g., a device that can implement the disclosed IoT DOCSIS protocol and that can serve to communicate with user devices 110 and/or other devices over the networks 105). As noted, the communications can be performed using the disclosed IoT DOCSIS protocol, described further herein.

Figure 2:
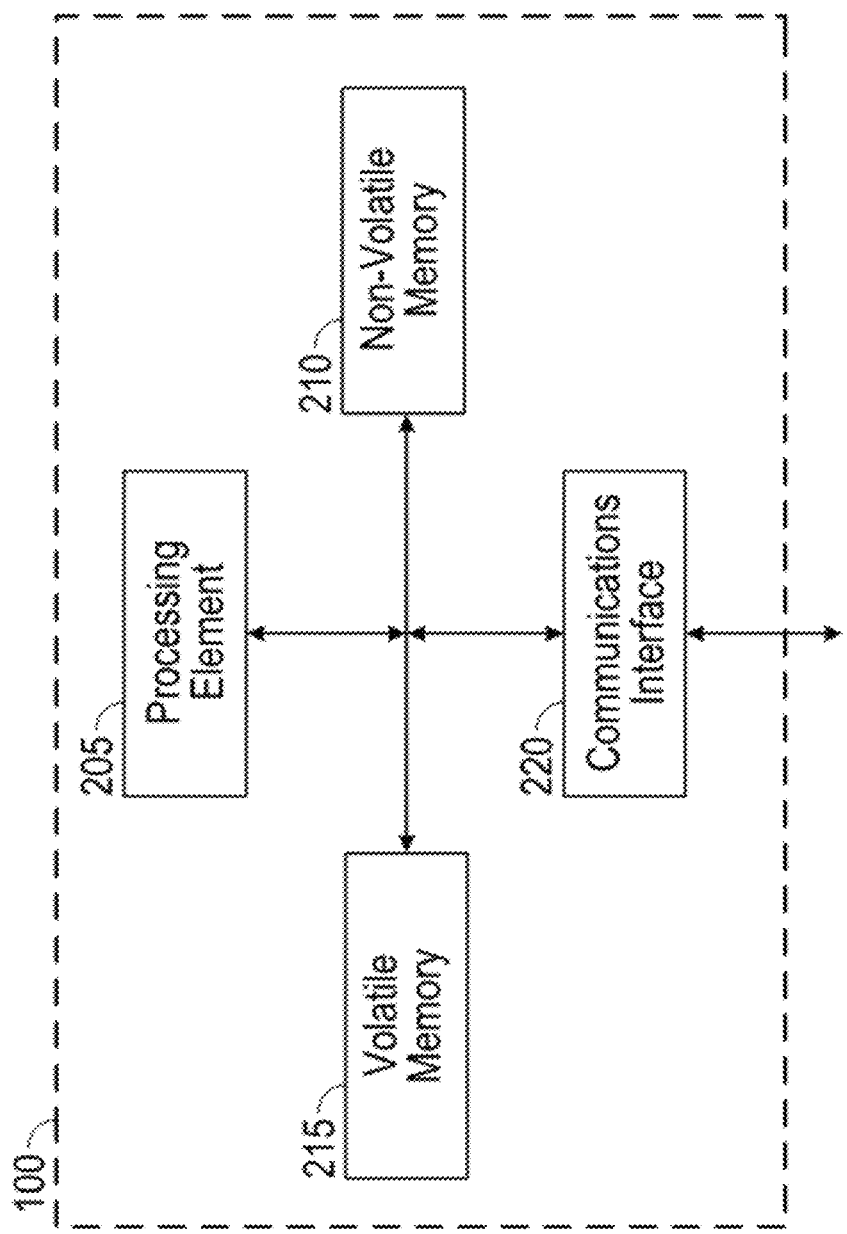
FIG. 2 shows an example schematic diagram of a management computing entity, in accordance with example embodiments of the disclosure.

FIG. 2 provides a schematic of a management computing entity 100 according to one embodiment of the present disclosure. Further, the management computing entity 100 may include a content component, a processing component, and a transmitting component (not shown). In particular, the content component may serve to determine signals indicative of data (e.g., video, audio, text, data, combinations thereof, and/or the like) to be transmitted over the network. In another embodiment, the determination of the signal for transmission may be, for example, based on a user input to the device, a predetermined schedule of data transmissions on the network, changes in network conditions, and the like. In one embodiment, the signal including that data may be encapsulated in a data frame, such as an IoT DOCSIS-based data frame (described further in connection to FIG. 4, below), that is configured to be sent from a device to one or more other devices on the network. In some examples, the IoT DOCSIS-based data frame may have a lower overhead than data frames transmitted between devices on the network using other protocols (e.g., DOCSIS-based protocols).

In another embodiment, the processing component may serve to determine various parameters associated with the signal for transmission over the network. For example, the processing component may serve to determine various parameters for the signal a modulation scheme (e.g., a particular quadrature amplitude modulation (QAM) modulation), a power level, a frequency band, header information associated with the signal, combinations thereof, and/or the like.

In one embodiment, the communications interfaces 220 may serve to transmit the signal from one IoT device to another device on the network (e.g., user devices 110 such as kiosks, tablets, computers, mobile phones, Bluetooth headsets, virtual and/or augmented reality headsets, and/or the like). For example, the communications interfaces 220 may serve to prepare a transmitter to transmit the signal over the network. For example, the transmitting component may queue the signal in one or more buffers, may ascertain that the transmitting device and associated transmitters are functional and have adequate power to transmit the signal over the network, may adjust one or more parameters (e.g., modulation type, signal amplification, signal power level, noise rejection, combinations thereof, and/or the like) associated with the transmission of the signal.

In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (for example Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. For instance, the management computing entity 100 may communicate with user devices 110 and/or a variety of other computing entities.

As shown in FIG. 2, in one embodiment, the management computing entity 100 may include or be in communication with one or more processing elements 205 (also referred to as processors, processing circuitry, and/or similar terms used herein interchangeably) that communicate with other elements within the management computing entity 100 via a bus, for example. As will be understood, the processing element 205 may be embodied in a number of different ways. For example, the processing element 205 may be embodied as one or more complex programmable logic devices (CPLDs), microprocessors, multi-core processors, co-processing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the management computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 100 with the assistance of the processing element 205 and operating system.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, ZigBee, Bluetooth protocols, wireless universal serial bus (USB) protocols, and/or any other wireless protocol.

Although not shown, the management computing entity 100 may include or be in communication with one or more input elements, such as a keyboard input, a mouse input, a touch screen/display input, motion input, movement input, audio input, pointing device input, joystick input, keypad input, and/or the like. The management computing entity 100 may also include or be in communication with one or more output elements (not shown), such as audio output, video output, screen/display output, motion output, movement output, and/or the like.

As will be appreciated, one or more of the management computing entity's 100 components may be located remotely from other management computing entity 100 components, such as in a distributed system. Furthermore, one or more of the components may be combined and additional components performing functions described herein may be included in the management computing entity 100. Thus, the management computing entity 100 can be adapted to accommodate a variety of needs and circumstances. As will be recognized, these architectures and descriptions are provided for example purposes only and are not limiting to the various embodiments.

A user may be an individual, a family, a company, an organization, an entity, a department within an organization, a representative of an organization and/or person, and/or the like. In one example, users may be employees, residents, customers, and/or the like. For instance, a user may operate a IoT device 110 that includes one or more components that are functionally similar to those of the management computing entity 100.

In various aspects, the processing element 205, and/or the communications interfaces 220 may be configured to operate on one or more devices (e.g., devices to be shown and described in connection with FIG. 4, below, which may include IoT devices and/or hub devices) may include aspects of the functionality of the management computing entity 100, as shown and described in connection with FIGS. 1-2 herein.

Figure 3:
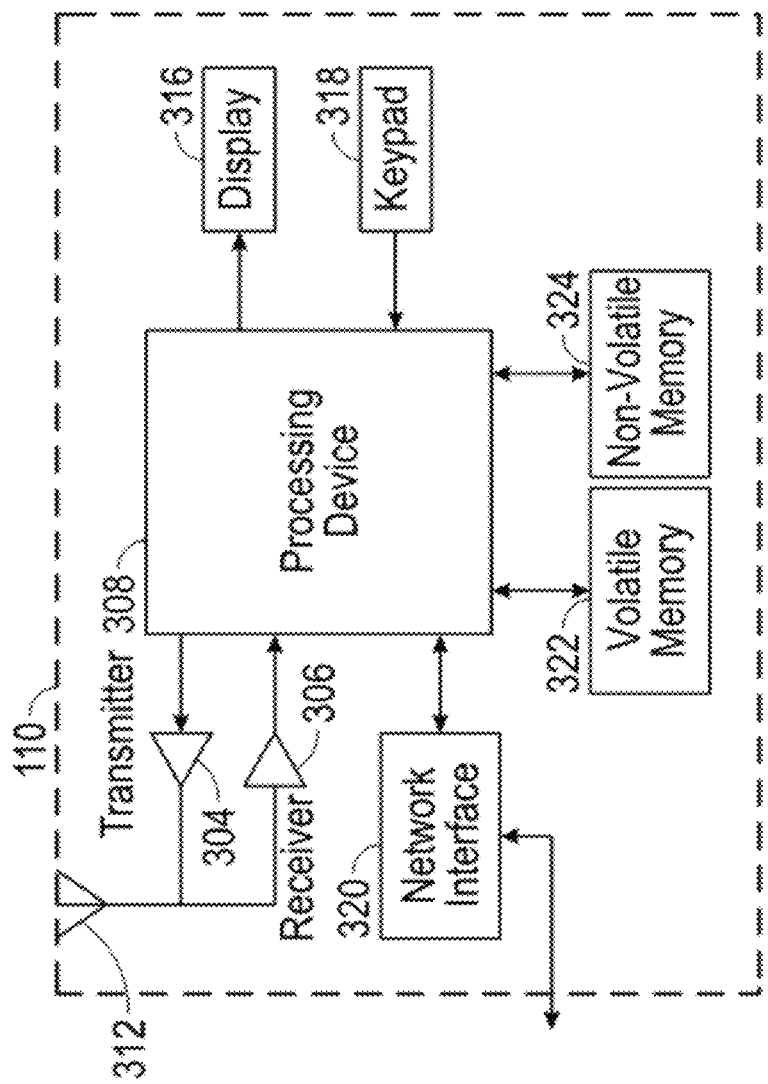
FIG. 3 shows an example schematic diagram of a user device, in accordance with example embodiments of the disclosure.

FIG. 3 provides an illustrative schematic representative of a IoT device 110 that can be used in conjunction with embodiments of the present disclosure. In general, the terms device, system, computing entity, entity, and/or similar words used herein interchangeably may refer to, for example, logical modules (e.g., processors and/or memory storing IoT DOCSIS-based computer-executable code) such as the management computing entity 100 embedded within or otherwise in communication within an IoT device 110 such as one or more computers, computing entities, desktops, mobile phones, tablets, phablets, notebooks, laptops, distributed systems, gaming consoles (for example Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User devices 110 can be operated by various parties. As shown in FIG. 3, the IoT device 110 can include an antenna 312, a transmitter 304 (for example radio), a receiver 306 (for example radio), and a processing element 308 (for example CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems (e.g., the disclosed IoT DOCSIS protocol and/or additional wireless protocols). In this regard, the IoT device 110 may be capable of operating with one or more air interface standards, communication protocols, modulation types, and access types. More particularly, the IoT device 110 may operate in accordance with any of a number of wireless communication standards and protocols, such as those described above with regard to the management computing entity 100. In a particular embodiment, the IoT device 110 may operate in accordance with multiple wireless communication standards and protocols, such as the disclosed IoT DOCSIS protocol, UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the IoT device 110 may operate in accordance with multiple wired communication standards and protocols, such as those described above with regard to the management computing entity 100 via a network interface 320.

Via these communication standards and protocols, the IoT device 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The IoT device 110 can also download changes, add-ons, and updates, for instance, to its firmware, software (for example including executable instructions, applications, program modules), and operating system.

According to one embodiment, the IoT device 110 may include location determining aspects, devices, modules, functionalities, and/or similar words used herein interchangeably. For example, the IoT device 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user device's 110 position in connection with a variety of other systems, including cellular towers, Wi-Fi access points, and/or the like. Similarly, the IoT device 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (for example smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The IoT device 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the IoT device 110 to interact with and/or cause display of information from the management computing entity 100, as described herein. The user input interface can comprise any of a number of devices or interfaces allowing the IoT device 110 to receive data, such as a keypad 318 (hard or soft), a touch display, voice/speech or motion interfaces, or other input devices. In embodiments including a keypad 318, the keypad 318 can include (or cause display of) the conventional numeric (0-9) and related keys (#, *), and other keys used for operating the IoT device 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The IoT device 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user device 110. As indicated, this may include a user application that is resident on the entity or accessible through a browser or other user interface for communicating with the management computing entity 100 and/or various other computing entities.

In another embodiment, the IoT device 110 may include one or more components or functionality that are the same or similar to those of the management computing entity 100, as described in greater detail above. As will be recognized, these architectures and descriptions are provided for example purposes only and are not limiting to the various embodiments.

As noted, various aspects of the disclosure are generally directed to IoT devices. In particular, as noted, an IoT device 110 may include the management computing entity 100 (including the processing element 205, non-volatile memory 210, volatile memory 215, and the communications interface 220) that can store and execute instructions for performing IoT DOCSIS-based communications, as described further below. In some instances, IoT devices can include relatively low-cost wireless transceivers that can be packaged with and/or included in the IoT devices (e.g., a car, a burglar system, home appliances, and the like). For example, an IoT device can include a sensor electronically and/or mechanically coupled to an otherwise electronically inactive object, such as a table. Continuing with this example, the sensor can be configured to detect when an object is placed on the table, and communicate, via a wireless transceiver, information associated with the table's status.

In some examples, given the widespread application of such IoT devices and applications, an IoT device's transceiver may need to have a relatively lower cost and a reduced physical footprint in comparison with transceivers for non-IoT devices in order to be applied at scale. In some aspects, such IoT devices can be configured to operate using an IoT DOCSIS protocol, which can describe a communications protocol based on the DOCSIS protocol. The DOCSIS protocol can describe the transmission of information over coaxial mediums. In particular, DOCSIS can refer to an international telecommunications standard, which can facilitate the addition of high-speed data transfer to a cable system. Further, DOCSIS can enable relatively high-performance and high-speed transmissions between devices, and can be configured to describe quality of service (QoS) capabilities for the devices as well.

Accordingly, embodiments of the disclosure are generally directed to using a DOCSIS-like protocol for use in the above mentioned IoT devices 110, referred variously herein as an IoT DOCSIS protocol. In some embodiments, the IoT DOCSIS protocol can be based on any suitable DOCSIS protocol including, but not limited to, at least one of (i) a DOCSIS 1.0, (ii) a DOCSIS 2.0, (iii) a DOCSIS 3.0, (iv) a DOCSIS 3.1, or (v) a DOCSIS 3.1 full-duplex specification. As noted, the IoT DOCSIS protocol described herein is based on DOCSIS protocol and associated devices (e.g., DOCSIS cable modems) that have already been deployed. Further, the use of DOCSIS protocols has led to a set of devices already deployed that can perform at a given level of QoS, and with which devices employing the described IoT DOCSIS protocol can communicate (e.g., using IoT DOCSIS frames and specific physical components as described further below).

As an example of a use case, DOCSIS can be used for IoT-based vehicle-to-vehicle (V2V) communications. While such V2V communications may be performed using 4G, long term evolution (LTE), and/or 5G protocols, there may not be an adequate native QoS mechanisms with those wireless protocols. Accordingly, by using a DOCSIS-based scheduling technique (i.e., the disclosed IoT DOCCSIS protocol), the disclosed systems can apply a QoS to the IoT-based V2V communications.

The IoT DOCSIS protocol, as described herein, can have various features based on the established DOCSIS protocol for hybrid fiber-coaxial (HFC) networks, but can have any number of differences to better align the IoT DOCSIS protocol for use in connection with IoT devices. For examples, the IoT DOCSIS protocol can have a reduced number of transmission queues (two queues, one for real time data transmissions and one for non-real time data transmissions), instead of multiple different queues corresponding to different QoS levels. Further distinctions between the IoT DOCSIS protocol and the HFC-based DOCSIS protocol are described below and throughout this disclosure. It should be noted that the disclosed IoT DOCSIS protocol can include various features for the communication between IoT devices that are not necessarily described in detail in this disclosure, but are known by one of ordinary skill in the art.

In various aspects, the present disclosure is generally directed to modifying DOCSIS-based chips and associated systems and methods to create an IoT framework for device-to-device communications. In one example, the IoT DOCSIS protocol can serve to decouple a medium access control (MAC) and a physical (PHY) layer functionality associated with the DOCSIS protocol and implemented via the exemplary IoT device. In other aspects, the disclosed systems describe including a DOCSIS MAC layer or a coaxial PHY layer connected to a DOCSIS MAC layer.

In some aspects, the DOCSIS PHY layer can be replaced in whole or in part with any suitable PHY layer. For example, the DOCSIS PHY layer can be replaced in whole or in part with a wireless protocol layer (e.g., a Wi-Fi-based physical layer or a 4G, LTE, and/or 5G-based PHY layer).

As another example, the DOCSIS PHY layer can be replaced in whole or in part with a passive optical network (PON)-based PHY layer or another optical physical layer. Further, the DOCSIS IoT protocol described herein can, while including the PHY layer of other mediums, retain some aspects of DOCSIS including, but not limited to, QoS, general latency packet loss standards, packet delivery determinism, and/or the like.

In other aspects, the conventional DOCSIS MAC layer may be relatively complex and may therefore be simplified for the purposes of the IoT-based DOCSIS MAC layer. In particular, the DOCSIS MAC layer may include various layers of priority, and the IoT-based DOCSIS MAC layer can be configured such that the scheduling can be simplified. For example, instead of having eight layers of priorities as in DOCSIS MAC (or in differentiated services code point (DSCP) protocols, 63 layers of priorities), in the IoT-based DOCSIS MAC two priority level can be defined, real time priority and non-real time priority. Accordingly, instead of having to schedule each transmitted packet, the disclosed systems may schedule the real time packets in bulk. For example, the disclosed systems may schedule the real time packets in bulk based on a pre-determined rule that indicates to continue to queue and transmit real time packets and deliver them in the first available instant. Further, for scheduling the non-real time packets, the disclosed systems can include the time that is left over after scheduling the real time packets. In some applications, such as in V2V communications, the communications can be performed in real time, while in other applications, such as in climate control application using thermostats, the communications may be in non-real time.

In some aspects, DOCSIS protocols can provide a mechanism for scheduling real time and non-real time transmission, and the IoT DOCSIS protocol can use, adopt, and/or modify the real time and non-real time scheduling over a different transmission medium (e.g., a wireless transmission medium instead of a cable-based transmission medium). As noted, in some examples, the disclosed systems can enable IoT DOCSIS transmissions for V2V communications and/or IoT DOCSIS-based scheduling of data packets over a wireless medium using long-term evolution (LTE), Wi-Fi, or similar protocols. In other example use cases, the disclosed systems can describe using the IoT DOCSIS protocol for base station transmissions to IoT device using Wi-Fi and can include transmitting Wi-Fi packets over coaxial cable with DOCSIS or via point-to-point Ethernet.

Accordingly, the disclosed systems may include an IoT DOCSIS protocol that has a simplified scheduling technique as compared with DOCSIS protocol. For example, instead of having to a relatively complex DOCSIS ecosystem that implements the full capabilities of orthogonal frequency division multiplexing (OFDM), OFD multiple access (OFDMA), single carrier quadrature amplitude modulation (QAM), and the like, the disclosed systems can serve to simplify the DOCSIS transmission protocol for IoT device communication purposes. For example, the IoT DOCSIS protocol can include one upstream channel and one downstream channel. Further, the disclosed systems can work with any suitable channel without regard to the underlying channel medium (e.g., coax, wireless, fiber, etc.).

In some examples, the disclosed systems may include communication protocols that may not require gigabits of bandwidth usage, but may only use kilobits of bandwidth usage. Accordingly, aspects of the present disclosure are directed to reducing and/or eliminating portions (e.g., complex modulation techniques, multilevel QoS categories for different data types, and the like) of the DOCSIS protocol to generate the IoT DOCSIS protocol. Further, this reduction in the features of the DOCSIS protocol can reduce the chip complexity and can reduce the power consumption of the resulting IoT DOCSIS chips. Such IoT DOCSIS chips can include similar capabilities of DOCSIS chips, such as low-power wide area networks (LPWAN) and long range (LoRa) wireless technology, and can be used with cellular chip technology.

In some examples, the disclosed systems describe an IoT DOCSIS protocol that may include an interface between the MAC layer and the PHY layer. In some aspects, the interface can include a point-to-point link (e.g., an Ethernet link). In other aspects, the interface can include any suitable data rate that is appropriate for IoT transmissions (e.g., approximately a 200 kilobits per second).

In some examples, the disclosed systems may include an IoT DOCSIS protocol that permits the use (e.g., plug-in use) of any suitable PHY layer associated with an IoT device. In particular, the IoT DOCSIS protocol can specify the data frames for packets transmitted via the PHY layer and/or the MAC layer. Accordingly, the disclosed systems can merely transmit the data frames received by the PHY layer from the MAC layer, and can be transmitted via the PHY layer.

More specifically, the MAC layer of the disclosed systems can be configured to schedule the data frames for the packets of information transmitted between IoT devices on a network. Accordingly, the disclosed systems can integrate PHY layer functionality based at least in part on any suitable protocol (e.g., Wi-Fi protocol, cellular protocol, 5G protocol, etc.) with the disclosed IoT DOCSIS protocol. The disclosed systems can provide a reduced-bandwidth interface link (e.g., a megabit link instead of a 10 gigabit link as may be used in some applications) between the MAC layer and the PHY layer. This reduced-bandwidth interface link can be implemented at least because the IoT devices may transmit relatively low-bandwidth information (e.g., information on the order of a couple kilobits per second).

Figure 4:
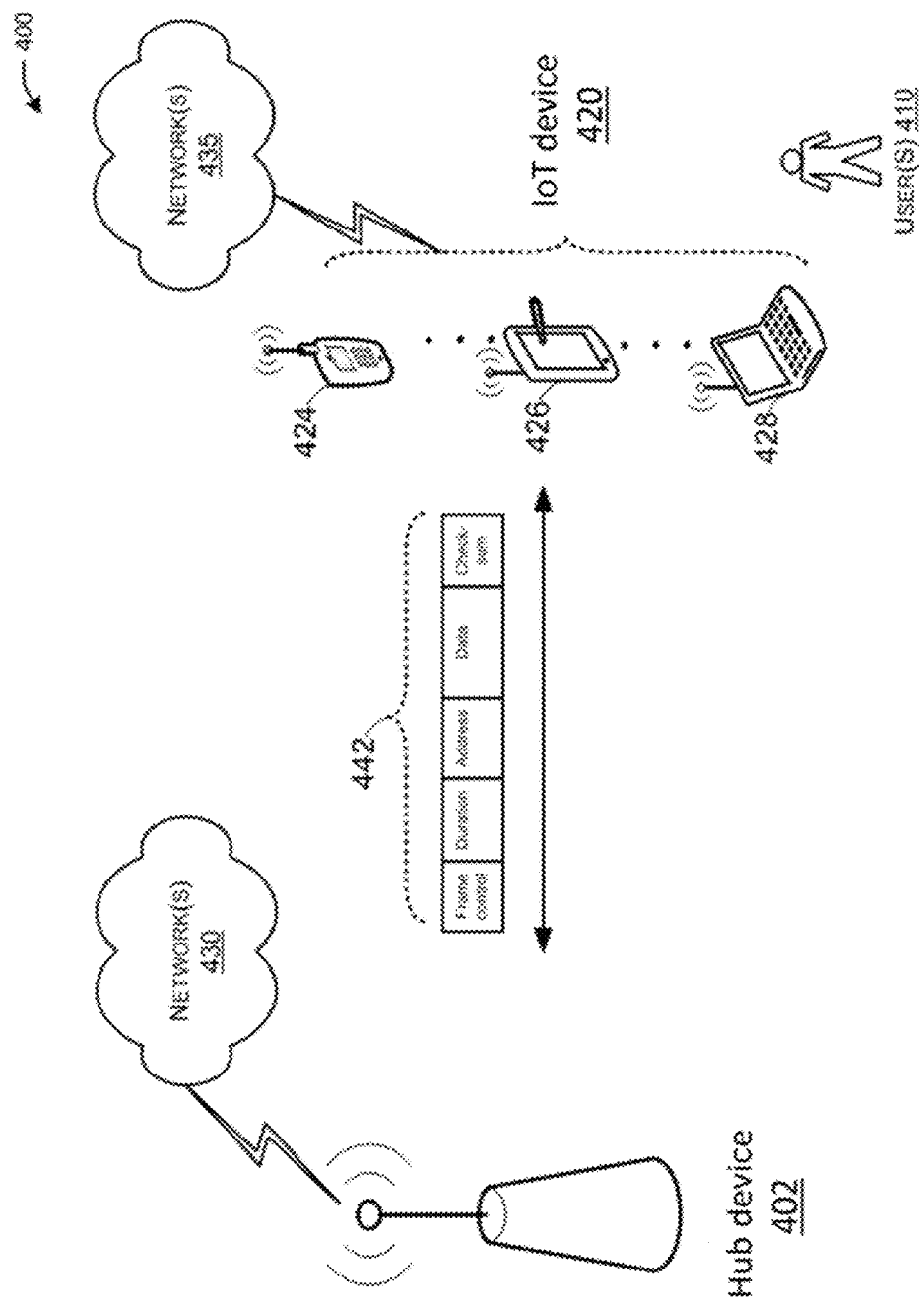
FIG. 4 is a network diagram illustrating an example network environment, according to some example embodiments of the present disclosure.

Before describing FIG. 4, certain contextual information is provided to offer an overview of QoS in a wireless network environment. In particular, wireless systems can make use of IP tunnels to provide services to attached user devices. Using tunnels, a centralized IP point of attachment (PoA) can be used that masks mobility from correspondent nodes connected to the Internet. Example tunnels that are commonly used in mobility architecture may be associated with certain wireless interfaces (e.g., General Packet Radio Service (GPRS) Tunneling Protocol (GTP), Proxy Mobile IPv6 (PMIPv6), and CDMA2000 based interfaces). In some aspects, tunneled wireless interfaces can be transported over IP networks. In some instances, those IP networks may be enhanced with differentiated QoS capabilities. As an example, DOCSIS access networks can include service flow capabilities together with packet cable multimedia components to allow QoS to be applied to real-time IP flows.

As noted, DOCSIS can refer to an international telecommunications standard, which can facilitate the addition of high-speed data transfer to a cable system. DOCSIS may be deployed by operators to provide Internet access over, for example, hybrid fiber-coaxial (HFC) infrastructure. In some embodiments, a DOCSIS architecture can include two primary components: a cable modem (CM) located at the customer premises and a cable modem termination system (CMTS) located at the headend. Cable systems supporting on-demand programming can use a HFC system. Fiber optic lines can bring digital signals to nodes in the system, where they can be converted into radio frequency (RF) channels and modem signals on coaxial trunk lines. A CMTS can be a device that hosts downstream and upstream ports.

FIG. 4 is a network diagram illustrating an example network environment, according to some example embodiments of the present disclosure. Wireless network 400 may include one or more devices 420 (e.g., IoT devices) and one or more APs 402 (hub devices that have IoT functionality), which may communicate in accordance with any suitable wireless standard (e.g., a IEEE 802.11 communication standards) and which may work with a IoT DOSCIS MAC protocol. In some cases, the device(s) 420 may be mobile devices that are non-stationary and do not have fixed locations. In some aspects, the APs 402 can communicate with a plurality of the devices 420 using the disclosed IoT DOCSIS protocol.

In some embodiments, hub devices such as a wireless access points can be configured to carry traffic for which certain data rate levels may be ensured. The hub device can be used to connect multiple IoT devices to each other and/or to a central device. Additionally, there are certain classes of service within the traffic such that network characteristics (e.g., latency and jitter) can be accommodated by an architecture. The base station can administer higher rates of service over the air (for example, over a cellular interface). In some embodiments, the backhaul can be generally controlled by the cable modem and the CMTS.

The user device(s) 420 (e.g., user devices 424, 426, or 428) may have IoT functionality and can include any suitable processor-driven user device including, but not limited to, a station (STA), a desktop user device, a laptop user device, a server, a router, a switch, an access point, a smartphone, a tablet, wearable wireless device (e.g., bracelet, watch, glasses, ring, etc.) and so forth.

Any of the user device(s) 420 (e.g., user devices 424, 426, 428), and AP 402 may be configured to communicate with each other via one or more communications networks 430 and/or 435 either wirelessly or wired, or a combination of both. Any of the communications networks 430 and/or 435 may include, but not limited to, any one of a combination of different types of suitable communications networks such as, for example, broadcasting networks, cable networks, public networks (for example, the Internet), private networks, wireless networks, cellular networks, or any other suitable private and/or public networks. Further, any of the communications networks 430 and/or 435 may have any suitable communication range associated therewith and may include, for example, global networks (for example, the Internet), metropolitan area networks (MANs), wide area networks (WANs), local area networks (LANs), or personal area networks (PANs). In addition, any of the communications networks 430 and/or 435 may include any type of medium over which network traffic may be carried including, but not limited to, coaxial cable, twisted-pair wire, optical fiber, a HFC medium, microwave terrestrial transceivers, radio frequency communication mediums, white space communication mediums, ultra-high frequency communication mediums, satellite communication mediums, or any combination thereof.

Any of the user device(s) 420 (e.g., user devices 424, 426, 428), and AP 402 may include one or more communications antennae. Communications antenna may be any suitable type of antenna corresponding to the communications protocols used by the user device(s) 420 (e.g., user devices 424, 424 and 428), and AP 402. Some non-limiting examples of suitable communications antennas include Wi-Fi antennas, IEEE 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user devices 420.

Any of the user devices 420 (e.g., user devices 424, 426, 428), and AP 402 may include any suitable radio and/or transceiver for transmitting and/or receiving RF signals in the bandwidth and/or channels corresponding to the communications protocols utilized by any of the user device(s) 420 and AP 402 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the IEEE 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications.

Typically, when a hub device (e.g., AP 402) establishes communication with one or more user devices 420 (e.g., user devices 424, 426, and/or 428), the hub device may communicate in the downlink direction by sending data frames (e.g. similar to data frame 442 which can comprise various fields such as a frame control field, a duration field, an address field, a data field, and a checksum field). The data frames may be preceded by one or more preambles that may be part of one or more headers. These preambles may be used to allow the user device to detect a new incoming data frame from the hub device. A preamble may be a signal used in network communications to synchronize transmission timing between two or more IoT devices (e.g., between the hub device and user devices). In some aspects, the communications may be scheduled using the IoT DOCSIS protocol as described herein.

Figure 5:
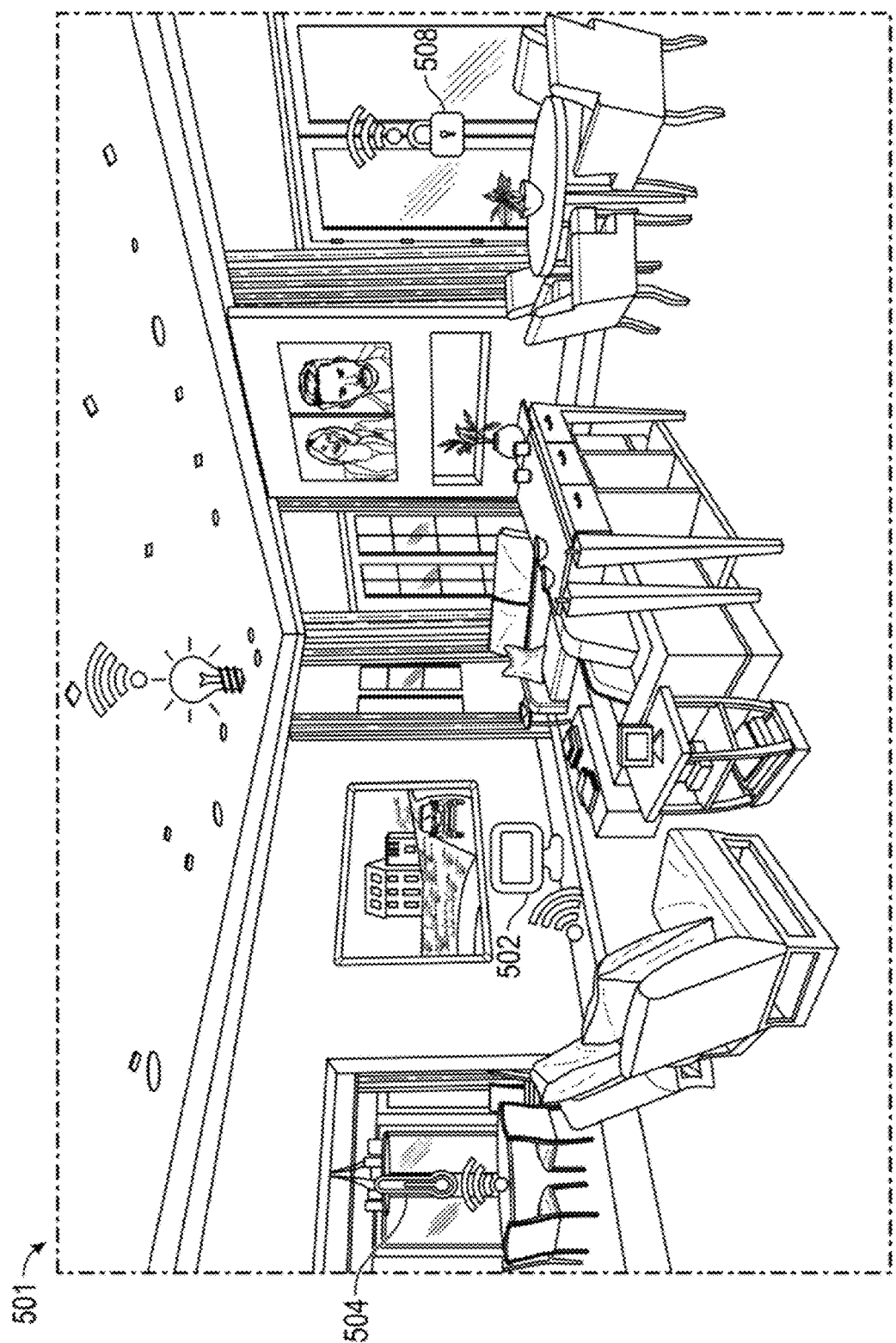
FIG. 5 is an illustration of an exemplary environment for using the disclosed IoT DOCSIS protocol, in accordance with example embodiments of the disclosure.

FIG. 5 is an illustration of an exemplary environment for using the disclosed IoT DOCSIS protocol, in accordance with example embodiments of the disclosure. As noted, the disclosed systems can be used in a variety of settings and environments. For example, the disclosed systems can be used in connection with a home environment 501. The home environment 501 can include IoT devices (e.g., IoT device 504, 506, etc. to be discussed below) that transmit information using the disclosed IoT DOCSIS protocol which defines two priority settings, a high-priority setting and a low-priority setting. For example, an IoT device 504 that set the temperature of the home environment 501 and an IoT device 506 that set the temperature of the refrigerator can be classified as transmitting low-priority information. In contrast, an IoT device 508 associated with security systems can be configured to transmit information with a relatively high priority as compared with the previously noted example IoT devices. In some aspects, the disclosed systems can include IoT devices configured to use the disclosed IoT protocol and to use DOCSIS-based modems and chips for the transmission of the high-priority information, as further shown and described in connection with FIG. 6, below. Further, if the DOCSIS-based modems and chips are damaged or otherwise unavailable, the IoT DOCSIS protocol can permit the IoT devices to use a backup transmission mode (e.g., cellular, Wi-Fi, etc.).

As noted, the disclosed systems can include a hub device 502 (e.g., similar to the AP device 402 shown and described in connection with FIG. 4, above) that can serve as a central point of connection for multiple IoT devices in the home environment 501. The hub device 502 can communicate with the various IoT devices using a variety of protocols. For example, the hub device 502 can primarily communicate via the disclosed IoT DOCSIS protocol, but may also communicate via more high-bandwidth protocols (e.g., Wi-Fi, 5G, etc.) under certain conditions (e.g., high network bandwidth-usage conditions). The various protocols used by the hub device may be registered with the various devices (both IoT and non-IoT devices) in the home environment 501, including those IoT devices that are not configured to communicate via the IoT DOCSIS protocol (e.g., legacy devices, etc.).

As noted, the IoT DOCSIS protocol can describe the use of an upstream and a downstream channel. Further, the IoT DOCISIS protocol can permit IoT devices to schedule respective transmission that are designated as being either real time or non-real time transmission. Moreover, the communication between the MAC layer and the PHY layer of the IoT devices using the disclosed IoT DOCSIS protocol can be based on a point-to-point link (e.g., an Ethernet link).

In some examples, the IoT DOCSIS protocol can allow for the at least partial accommodation of additional communications protocol (e.g., Wi-Fi, 4G, LTE, 5G, etc.) in the PHY layer of the IoT devices. Further, there may be an additional interface from the MAC layer to the PHY layer, which may or may not be pluggable depending on the nature of the additional communication protocol and its compatibility with the IoT DOCSIS protocol.

In some aspects, the disclosed systems can use the IoT DOCSIS protocol to frame the data and/or frame from a given protocol (e.g., a 5G data and/or frame) into a DOCSIS-based frame, and can handover the DOCSIS-based frame to the PHY layer. Further, the PHY layer can transmit the DOCSIS-based frame over a different medium (e.g., a coaxial medium) in addition to the wireless medium. In some examples, the PHY layer can transmit the DOCSIS-based frame using any suitable scheduling mechanism, including, but not limited to, a weighted fair queuing scheduling mechanism.

In some examples, the hub device 502 may generate relatively complex and/or high-bandwidth data. The disclosed systems can, by using the disclosed IoT DOCSIS protocol, filter the data, repackage the data in a simpler way by removing DOCSIS-protocol overhead, and then send a lower-complexity and/or lower-bandwidth transmission to the various IoT devices that are in communication with the hub device 502 on the downstream.

In other examples, the IoT devices that implement the IoT DOCSIS protocol may have fewer components and may generate and transmit data having a lower complexity and/or bandwidth in comparison with the hub device 502. For example, the IoT device may include a transceiver and an ability to transmit relatively low-bandwidth transmission using the described IoT DOCSIS protocol, while the hub device 502 may include the capability to communicate with multiple devices (IoT devices and non-IoT devices) over various transmission media (e.g., cable, air, etc.) and using various protocols (e.g., IoT DOCSIS, Wi-Fi, and/or cellular protocols). In some examples, the hub can be connected to a cable modem. Alternatively or additionally, the hub can include a cable modem and the hub can have a cellular (e.g., a 4G or 5G) or Wi-Fi capability.

In some examples, the hub device 502 can prioritize and schedule communications between itself and various IoT devices. For example, the hub device 502 can set up transmission times based on any suitable protocol, such as an ALOHAnet protocol. In particular, the ALOHAnet protocol can allow the IoT devices to identify themselves and identify that they have data to transmit. Further, if a given IoT device has a significant amount of data to transmit, then the IoT device can have multiple chances to transmit the data. As previously noted, these transmissions may have a reduced bandwidth and can be real time. For example, the IoT DOCSIS protocol can allow the IoT device to transmit approximately every second and can specify a transmission interval of about 20 milliseconds from the beginning of the second. Accordingly, the disclosed IoT DOCSIS protocol can be applied to specify the allowed bandwidth usage and/or timing of the data transmissions for a given IoT device. Further, the bandwidth and/or the timing can be based on much data the given device has to transmit, and/or the regularity of those transmissions. Further, the transmission intervals can be used or not used by IoT device, based on the IoT device's need. Accordingly, the IoT DOCSIS protocol can provide the data transmission time slots, and the transmitting IoT devices may not need to request, from the hub device (or other receiving IoT devices), a transmission interval every time that the IoT devices transmit data.

In the home environment 501 shown in FIG. 5, there may be a number of devices registered (e.g., about 10 devices). Further, one device may be a high priority device (e.g., the security device), and the others are may be light bulbs and thermostats, that have lower priority data. The devices having the lower-priority data may have data transmissions related to their status (e.g., power status, data transmission availability status, etc.). In some cases, the type of device can determine the time interval length assigned by the disclosed systems and based on the disclosed IoT DOCSIS protocol for the device to communicate.

In some cases, IoT devices transmitting high priority data can have their data transmitted even before their scheduled time interval for transmissions. In particular, the disclosed systems can permit a hub device 502 to have a scheduler that can maintain a list of data of associated IoT devices that has to be transmitted with little to no delay. Further, the scheduler can maintain a list of IoT devices whose associated data may need to fit into the next available transmission window. The scheduler can therefore cause those IoT devices that have to transmit data to transmit first, then cause remaining IoT devices that have real time data that is not urgent into transmit at specific timeslots. Further, the scheduler can schedule the remaining IoT devices to transmit their data (e.g., non-real time and not urgent data) at the next available time slots. Further, the scheduler may transmit a map to the IoT devices in the network, the map informing the IoT devices about when they are able to transmit data. Accordingly, once the IoT devices register with the scheduler and confirm their identity (e.g., device type, bandwidth needs, etc.), the scheduler can automatically handle data transmission requests to the hub device 502. Further, the hub device 502 may need to use regular scheduling mechanism to further communicate upstream (e.g., to a headend device), for example, to transmit network information or obtain certain content. In further embodiments, any one of the IoT devices can be designated as a hub device 502 and maintain the scheduler functionality described above, and the remaining IoT devices can communicate based on the schedule provided by the hub device 502. In some embodiments, only one of the IoT device be designated as a hub device 502 and maintain the scheduler functionality described above, and the remaining IoT devices can communicate based on the schedule provided by the hub device 502.

Continuing with the example shown in FIG. 5, if a security alarm associated with one of the IoT devices is tripped, the IoT device can transmit a signal periodically within a predetermined time period (e.g., every 20 milliseconds). Accordingly, the transmission of the signal by the IoT device can occur in near real time (e.g., there can be about 50 transmit opportunities in a second in this example). Once a transmission window opens, the IoT device can transmit immediately without further delay. Moreover, the IoT device may not need to do any scheduling because a hub device 502 may be configured to handle the scheduling of the IoT device's communications; instead, the IoT device may be configured to merely transmit via its transmitter as soon as the security alarm is tripped. The hub device can be configured to ensure that the communications originating from this IoT device are delivered according to a predetermined schedule.

In other aspects, if the IoT device connects with the hub device 502, the IoT device can come online, communicate with the hub device identifying itself as an IoT device. Further, the IoT device can obtain information associated with the transmission windows that the hub device 502 can assign it. For example, the hub device 502 can communicate back to the IoT device confirming the IoT device's identity and can inform the IoT device that it can transmit every second at predetermined time interval (e.g., every 20 milliseconds). The hub device 502 can select the predetermined time interval based on the type and/or identity of the IoT device. For example, the hub device can determine that a different device that generates lower-priority data transmission (e.g., a thermostat) can transmit data at a different interval (e.g., every 10 minutes).

Figure 6:
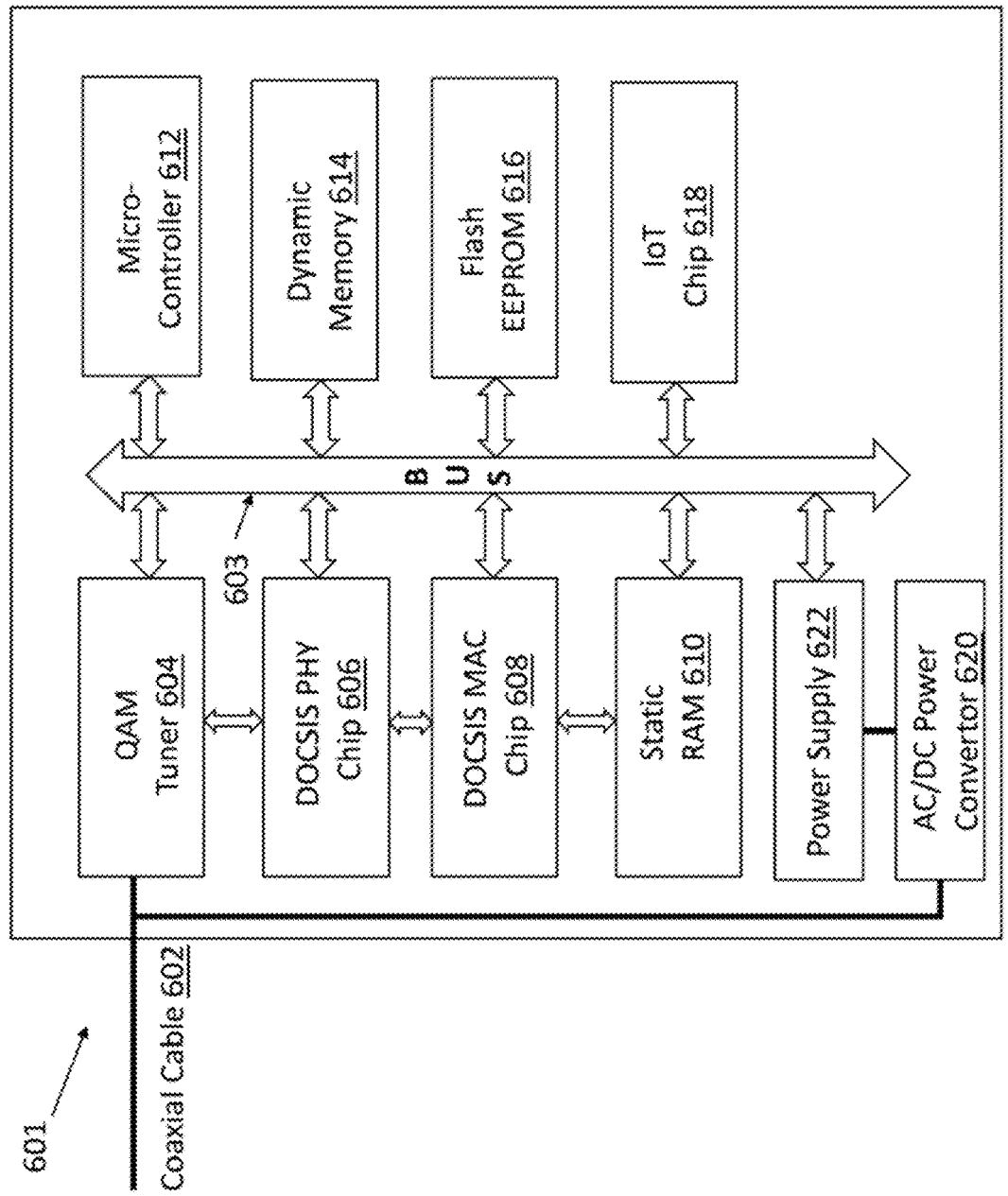
FIG. 6 is an illustration of an exemplary IoT device configured to implement aspects of the disclosed IoT DOCSIS protocol, in accordance with example embodiments of the disclosure.

FIG. 6 is an illustration of an exemplary hub IoT device configured to implement aspects of the disclosed IoT DOCSIS protocol, in accordance with example embodiments of the disclosure. As previously noted, the IoT devices that use the IoT DOCSIS protocol as described herein may have relatively lower complexity as compared with other wireless-communication capable devices. For example, an exemplary IoT device may not need to have a complementary metal-oxide-semiconductor (CMOS)-based tuner device, a flash memory device, a synchronous dynamic random access memory (SDRAM), a fully-functional Ethernet module, a PC card, advanced modulators, advanced demodulators, peripheral logic, timing chips, and the like. In other aspects, as described further below, the disclosed IoT devices may need a tuner (e.g., a downstream tuner and/or an upstream tuner), a modulator, a demodulator (e.g., a modem), and the capability to operate with the disclosed IoT DOCSIS protocol. Further, the tuners may not need to be operable over a relatively large frequency range.

As shown in FIG. 6, exemplary IoT device 600 (hereinafter device 600) can be connected to a network via a coaxial cable 602. Further, device 600 can include a Quadrature Amplitude Modulation (QAM) tuner 604, a DOCSIS-based PHY chip 606, a DOCSIS-based MAC chip 608, a static RAM 610, a microcontroller 612, a dynamic memory 614, a flash-based electrically erasable programmable read-only memory (EEPROM) 616, an IoT chip 618, an alternating current (AC) and direct (DC) power converter 620, and a power supply 622.

In some examples, the QAM tuner 604 can serve to receive a digital signal from the cable company or other content provider, such as via coax cable 602. The QAM tuner 604 can be configured to communicate using QAM protocols which can represent digital modulation methods and a related family of analog modulation methods to transmit information. In particular, the QAM tuner 604 can be configured to generate or detect analog message signals or digital bit streams, by changing (modulating) the amplitudes of carrier waves, using the amplitude-shift keying (ASK) digital modulation scheme or amplitude modulation (AM) analog modulation scheme. QAM tuner 604 can use extra data that is sent along with the main digital signal in order to fill in gaps created due to data loss.

In some examples, the DOCSIS PHY chip 606 can perform any number of PHY-based operations, including, but not limited to, data encoding and decoding, scrambling and descrambling, alignment marker insertion and removal, block and symbol redistribution, and can implement the hardware send and receive function of data frames. The DOCSIS PHY chip 606 can serve to connect the MAC layer of the device to a physical medium such as a wireless medium, and/or optical fiber or copper cable.

The DOCSIS MAC chip 608 can perform any number of MAC-based operations, including, but not limited to, frame delimiting and recognition, addressing of source and destination devices, protecting against errors (e.g., by generating and checking frame check sequences), and controlling access to the physical transmission medium.

In some examples, the static RAM 610 can include a semiconductor-based RAM that can use bistable latching circuitry (flip-flop) to store the bits of data. SRAM can be volatile in that data is eventually lost when the memory is not powered. The static RAM 610 can have the advantage of lower complexity (e.g., the static RAM 610 may not need a refresh circuit as other types of memory may need), relatively high performance and reliability for a given cost-point, and relatively low idle power consumption.

In various aspects, the microcontroller 612 can be used instead of a more complex processor in the IoT device. The microcontroller 612 can have a relatively lower size and cost as compared with a design that uses a separate processor, memory, and input/output devices. In the context of disclosed IoT DOCSIS protocol, the microcontroller 612 can be used as an economical and popular means of data collection, sensing and interacting with the IoT device's environment. In particular, the microcontroller 612 can be configured to have the ability to retain functionality while waiting for an event such as a button press or other interrupt; power consumption while sleeping may be relatively low (e.g., nano watts). The microcontroller 612 can incorporate a block of digital logic that can be customized for additional processing capability, peripherals and interfaces that are adapted to the requirements of the application.

In some examples, the dynamic memory, that is, the DRAM 614, can include a type of random access semiconductor memory that can store bits of data in a separate capacitors within an integrated circuit. As such, the DRAM 614 can serve as a relatively low-cost and high-capacity memory for IoT applications.

In some examples, the flash electrically erasable programmable read-only memory (EEPROM) 616 can be configured to store data that can enable the startup of the IoT device 600 bootup parameters, etc.).

In some examples, the IoT chip 618 can implement aspects of the functionality of the disclosed IoT DOCSIS protocol. The IoT chip 618 can include a modem. The IoT chip 618 can be configured to operate using various wireless protocols, including, but not limited to, cellular protocols (e.g., 3G, 4G, 5G), Wi-Fi protocols, Bluetooth protocols, ZigBee protocols, and/or the like. The IoT chip 618 can be configured to operate using various wired protocols, including, but not limited to, Ethernet, power-line communication (PLC), and/or the like.

The AC/DC power converter 620 can be connected to the coaxial cable 602. In some examples, the AC/DC power converter 620 can receive AC power from the coaxial cable 602 and can convert this AC power to DC power and provide power to the modules of the device 600, described above. Further, the AC/DC power converter 620 can recharge the power supply 622. The power supply 622 can provide power to the modules of the device 600 absent a coaxial cable 602 power connection.

Figure 7:
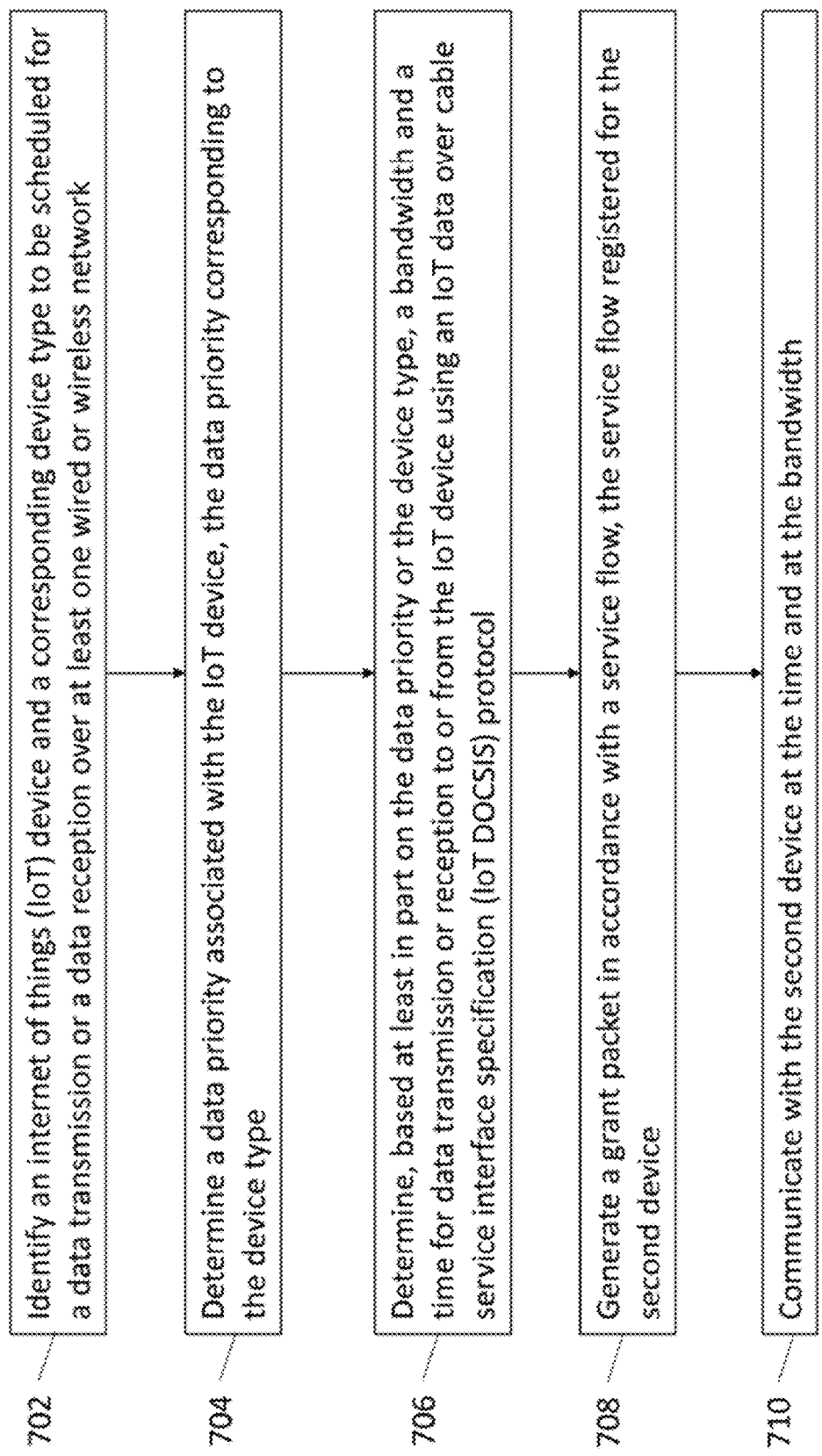
FIG. 7 is an illustration of an exemplary method of operating the disclosed IoT devices using the IoT DOCSIS protocol, in accordance with example embodiments of the disclosure.

FIG. 7 is an illustration of an exemplary method of operating the disclosed IoT devices using the IoT DOCSIS protocol, in accordance with example embodiments of the disclosure. At block 702, the disclosed systems can identify an IoT device and a corresponding device type to be scheduled for a data transmission or a data reception over at least one wired or wireless network. In some examples, the wired network can include an Ethernet network, and the wireless network includes at least one of a Wi-Fi, a cellular, a narrowband IoT, a low-power WAN (LPWAN), or a 5G network.

At blocks 704, the disclosed systems can determine a data priority associated with the IoT device, the data priority corresponding to the device type. For example, devices that transmit relatively time-insensitive information (e.g., information associated with slowly changing temperatures in a home environment) may be designated as low-priority. On the other hand, device that transmit time-sensitive information (e.g., security alarm status information) may be designated as high-priority.

At block 706, the disclosed systems can determine, based at least in part on the data priority or the device type, a bandwidth and a time for data transmission or reception to or from the IoT device using an IoT DOCSIS protocol. In some examples, the IoT DOCSIS protocol can include a predetermined bandwidth threshold, and the bandwidth is below the predetermined bandwidth threshold. IoT DOCSIS protocol can include a real time and a non-real time communication mode. The device can be configured to communicate with the second device at the time and at the bandwidth comprises using the IoT DOCSIS protocol to generate a MAC layer or a PHY-based frame. In another embodiment, the determination of the bandwidth and the time period can be performed using an algorithm, the algorithm comprising at least one of a random early detection (RED) algorithm, a weighted random early detection (WRED) algorithm, an adaptive RED (ARED) algorithm, a robust random early detection (RRED) algorithm, a blue algorithm, a stochastic fair blue (STB) algorithm, a weighted fair queuing (WFQ) algorithm, and/or any suitable technique.

At block 708, the disclosed systems can generate a grant packet in accordance with a service flow, the service flow registered for a second device. In particular, the grant packet can indicate that the device can communicate data with a second device. In some examples, the service flow can include a DOCSIS-based QoS. In another embodiment, the service flow can include at least one of an unsolicited grant service (UGS) flow, a real-time polling flow, an UGS active detection (AD) flow, a non-real-time polling service, a best effort service flow, a committed information rate service flow, or a dynamic service flow, or any other suitable flow known by one of ordinary skill in the art. In another aspect, the service flow can be identified by a service flow identifier (SFID).

At block 710, the disclosed systems can communicate with the second device at the time and at the bandwidth. In some embodiments, the communication can include a transmission of data including audio, video, and information. In some aspects, the IoT device can further uses the IoT DOCSIS protocol to determine additional bandwidths and start times for one or more additional IoT devices. In some aspects, the device is configured to identify an IoT device including a pluggable PHY layer device. In some examples, the disclosed systems can schedule transmission opportunities from the IoT devices in a given network of devices (e.g., home security devices, door lock devices, window lock devices, sensor devices, smoke alarm devices). For example, such IoT devices can be schedule to have the chance to transmit information periodically (e.g., every 20 milliseconds, every 100 milliseconds, etc.).

In an embodiment, the disclosed systems, methods, and apparatuses for wireless packet scheduling can use an IoT DOCSIS protocol-based MAC packet scheduler. In some embodiments, the disclosed IoT DOCSIS MAC scheduler can be partially or fully replace a traditional wireless scheduler, for example, a Wi-Fi scheduler defined in connection with an IEEE 802.11 standard. In some embodiments, a wireless network including such an IoT DOCSIS MAC packet scheduler can have several improvements over conventional wireless networks, including, but not limited to, a reduction in lost packets due to collisions, a higher channel bandwidth performance by optimizing time-for-packet transmissions, and the addition of further network capabilities including, but not limited to, provisioned-bandwidth allocation to network devices using one or more scheduler algorithms.

In some embodiments, the scheduler and associated functionality can be performed by the hub device. In an alternate embodiment, one or more IoT devices may perform scheduler functionality. In some embodiments, the hub device and/or the IoT devices can be similar to the management computing entity 100, described above. One or more IoT devices may establish, through signaling, that a designated IoT device will perform scheduling. In this case, the designated IoT devices can serve as the hub device. The designated hub device may change over time. One or more IoT devices or hub devices may have a connection to an external network, for example, a cable network. In some embodiments, a hub device (or designated IoT device) may manage scheduling for a connection between two other IoT devices. In this fashion, the data transmission occurs directly between the IoT devices, and only the control signaling such as requests and grants can be transmitted to and received from the managing hub device (or designated IoT device). Various configurations including these options and others will readily adapted by those of skill in the art in light of the teachings herein.

Figure 8:
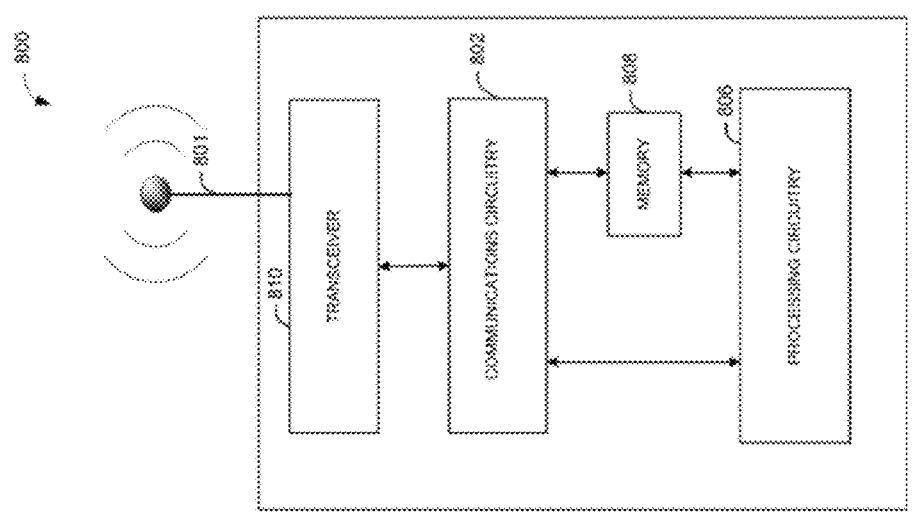
FIG. 8 shows a functional diagram of an exemplary communication station in accordance with some embodiments.

FIG. 8 shows a functional diagram of an exemplary communication station 800 in accordance with some embodiments. In one embodiment, FIG. 8 illustrates a functional block diagram of a communication station that may be suitable for use as a hub device (e.g., similar to AP 402 (FIG. 4) or communication station user device 420 (FIG. 4) in accordance with some embodiments. The communication station 800 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 800 may include communications circuitry 802 and a transceiver 810 for transmitting and receiving signals to and from other communication stations using one or more antennas 801. The communications circuitry 802 may include circuitry that can operate the physical layer communications and/or MAC communications for controlling access to the wireless medium, and/or any other communications layers for transmitting and receiving signals. The communication station 800 may also include processing circuitry 806 and memory 808 arranged to perform the operations described herein. In some embodiments, the communications circuitry 802 and the processing circuitry 806 may be configured to perform operations detailed in FIGS. 1-7.

In accordance with some embodiments, the communications circuitry 802 may be arranged to contend for a wireless medium and configure frames or packets for communicating over the wireless medium. The communications circuitry 802 may be arranged to transmit and receive signals. The communications circuitry 802 may also include circuitry for modulation/demodulation, upconversion/downconversion, filtering, amplification, etc. In some embodiments, the processing circuitry 806 of the communication station 800 may include one or more processors. In other embodiments, two or more antennas 801 may be coupled to the communications circuitry 802 arranged for sending and receiving signals. The memory 808 may store information for configuring the processing circuitry 806 to perform operations for configuring and transmitting message frames and performing the various operations described herein. The memory 808 may include any type of memory, including non-transitory memory, for storing information in a form readable by a machine (e.g., a computer). For example, the memory 808 may include a computer-readable storage device may, read-only memory (ROM), random-access memory (RAM), magnetic disk storage media, optical storage media, flash-memory devices and other storage devices and media.

In some embodiments, the communication station 800 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 800 may include one or more antennas 801. The antennas 801 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 800 may include one or more of a keyboard, a display, a non-volatile memory port, multiple antennas, a graphics processor, an application processor, speakers, and other mobile device elements. The display may be an LCD screen including a touch screen.

Although the communication station 800 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 800 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 800 may include one or more processors and may be configured with instructions stored on a computer-readable storage device memory.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments can relate to wireless networks that operate in accordance with one of the IEEE 802.11 standards.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infrared (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Although an example processing system has been described above, embodiments of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an embodiment of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific embodiment details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

V. CONCLUSION

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A device, comprising:
   at least one memory device that stores computer-executable instructions; and
   at least one processor configured to access the at least one memory device, wherein the at least one processor is configured to execute the computer-executable instructions to:
      determine an internet of things (IoT) device, the IoT device having a corresponding device type, to be scheduled for at least one of a data transmission or a data reception over at least one wired or wireless network;
      determine a data priority associated with the IoT device, the data priority associated with a device type;
      determine, based at least in part on the data priority or the device type, a bandwidth and a time for data transmission or reception to or from the IoT device using an IoT data over cable service interface specification (IoT DOCSIS) protocol, wherein the IoT DOCSIS protocol is a different protocol than a DOCSIS protocol;
      generate a grant packet in accordance with a service flow, the service flow registered for a second IoT device;
      receive first data formatted in accordance with a first protocol;
      generate, based on the first data, second data formatted in accordance with the DOCSIS protocol;
      generate, based on the second data, third data by filtering the second data to remove DOCSIS overhead data of the first data; and
      cause to send the third data to the second IoT device at the time and at the bandwidth.

2. The device of claim 1, wherein the IoT DOCSIS protocol comprises a predetermined bandwidth threshold, and wherein the bandwidth is below the predetermined bandwidth threshold.

3. The device of claim 1, wherein the service flow comprises a DOCSIS-based quality of service (QoS).

4. The device of claim 1, wherein to communicate with the second IoT device at the time and at the bandwidth comprises using the IoT DOCSIS protocol to generate a medium access control (MAC) layer-based frame or a physical (PHY) layer-based frame.

5. The device of claim 1, wherein the IoT device is configured to identify a second IoT device comprising a pluggable PHY layer device, wherein the pluggable PHY layer device is associated with a second type of wireless or wired protocol that is different than the DOCSIS protocol.

6. The device of claim 1, wherein the at least one processor is configured to execute the computer-executable instructions to determine additional bandwidths and times for one or more additional IoT devices based on the IoT DOCSIS protocol.

7. The device of claim 1, wherein the wired network includes an Ethernet network, and the wireless network includes at least one of a Wi-Fi, a cellular, a narrowband IoT, a low-power wide area network (LPWAN), or a 5G network.

8. The device of claim 1, wherein the at least one processor is further configured to execute the computer-executable instructions to:
   determine that DOCSIS-based hardware is unavailable; and determine, based on the determination that the DOCSIS-based hardware is unavailable, a second bandwidth and a second time for second data transmission or reception to or from the IoT device using a second protocol that is a different type of protocol than the IoT DOCSIS protocol or the DOCSIS protocol.

9. The device of claim 1, wherein the device is a hub device, wherein communicating with the second IoT device comprises sending the second data to the second IoT device, wherein generating the third data is performed by the second IoT device.

10. The device of claim 1, wherein the IoT DOCSIS protocol comprises only two transmission queues including a real time and a non-real time communication mode, wherein the IoT DOCSIS protocol includes a different number of transmission queues than the DOCSIS protocol.

11. A method, comprising:
determining an IoT device, the IoT device having a corresponding device type to be scheduled for a data transmission or a data reception over at least one wired or wireless network;
determining a data priority associated with the IoT device, the data priority corresponding to a device type;
determining, based at least in part on the data priority or the device type, a bandwidth and a time for data transmission between the IoT device and a second device using an IoT DOCSIS protocol, wherein the IoT DOCSIS protocol is a different protocol than a DOCSIS protocol;
receiving first data formatted in accordance with a first protocol;
generating, based on the first data, second data formatted in accordance with the DOCSIS protocol; and
generating, based on the second data, third data by filtering the second data to remove DOCSIS overhead data of the first data; and
causing to send the third data to a second IoT device at the time and at the bandwidth.

12. The method of claim 11, wherein the IoT DOCSIS protocol comprises a predetermined bandwidth threshold, and the bandwidth is below the predetermined bandwidth threshold.

13. The method of claim 11, further comprising:
generate a grant packet in accordance with a service flow, the service flow registered for the second device, wherein the service flow comprises a DOCSIS-based QoS.

14. The method of claim 11, wherein to communicate with the second device at the time and at the bandwidth comprises using the IoT DOCSIS protocol to generate a MAC layer or a PHY based frame.

15. A non-transitory computer-readable medium storing computer-executable instructions which, when executed by a processor, cause the processor to perform operations comprising:
identifying an IoT device and a corresponding device type to be scheduled for a data transmission or a data reception over at least one wired or wireless network;
determining a data priority associated with the IoT device, the data priority corresponding to a device type;
determining, based at least in part on the data priority or the device type, a bandwidth and a time for data transmission between the IoT device and a second device using an IoT DOCSIS protocol, wherein the IoT DOCSIS protocol is a different protocol than a DOCSIS protocol;
receiving first data formatted in accordance with a first protocol;
generating, based on the first data, second data formatted in accordance with the DOCSIS protocol;
generating, based on the second data, third data by filtering the second data to remove DOCSIS overhead data of the first data; and
causing to send the third data to a second IoT device at the time and at the bandwidth.

16. The non-transitory computer-readable medium of claim 15, wherein the IoT DOCSIS protocol comprises a predetermined bandwidth threshold, and the bandwidth is below the predetermined bandwidth threshold.

17. The non-transitory computer-readable medium of claim 15, wherein the computer-executable instructions further cause the processor to perform operations comprising:
generating a grant packet in accordance with a service flow, the service flow registered for the second device, wherein the service flow comprises a DOCSIS-based QoS.

18. The non-transitory computer-readable medium of claim 15, wherein communicating with the second device at the time and at the bandwidth comprises using the IoT DOCSIS protocol to generate a MAC layer or a PHY based frame.

19. The non-transitory computer-readable medium of claim 15, wherein the IoT device further uses the IoT DOCSIS protocol to determine any additional bandwidths and times for one or more additional IoT devices.

20. The non-transitory computer-readable medium of claim 15, wherein the wired network includes an Ethernet network, and the wireless network includes at least one of a Wi-Fi, a cellular, a narrowband IoT, a LPWAN, or a 5G network.

* * * * *